(12) United States Patent
Wang

(10) Patent No.: US 12,452,001 B2
(45) Date of Patent: *Oct. 21, 2025

(54) RESOURCE ALLOCATION FOR FEEDBACK IN GROUPCAST COMMUNICATION

(71) Applicant: NEC CORPORATION, Tokyo (JP)

(72) Inventor: Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/749,735

(22) Filed: Jun. 21, 2024

(65) Prior Publication Data

US 2024/0340111 A1    Oct. 10, 2024

Related U.S. Application Data

(63) Continuation of application No. 17/432,784, filed as application No. PCT/CN2019/075941 on Feb. 22, (Continued)

(51) Int. Cl.
*H04L 1/1812* (2023.01)
*H04L 1/1867* (2023.01)
(Continued)

(52) U.S. Cl.
CPC .......... *H04L 1/1819* (2013.01); *H04L 1/1812* (2013.01); *H04L 1/1896* (2013.01);
(Continued)

(58) Field of Classification Search
CPC ... H04L 1/1819; H04L 1/1812; H04L 1/1896; H04L 5/0055; H04L 2001/0093;
(Continued)

(56) References Cited

U.S. PATENT DOCUMENTS

2013/0148563 A1    6/2013  Brueck
2015/0092656 A1    4/2015  Lindh et al.
(Continued)

FOREIGN PATENT DOCUMENTS

CN    101621361 A    1/2010
CN    101741528 A    6/2010

OTHER PUBLICATIONS

Written opinion for PCT/CN2019/075941 dated Jul. 23, 2019.
(Continued)

*Primary Examiner* — Marisol Figueroa
(74) *Attorney, Agent, or Firm* — Sughrue Mion, PLLC

(57) ABSTRACT

Embodiments of the present disclosure relate to resource allocation for feedback in groupcast communication. A method comprises identifying a plurality of destination devices for reception of data from a source device in groupcast communication; in response to the number of the plurality of destination devices being below a threshold, allocating resources to the plurality of destination devices to enable feedback transmission associated with the reception by the plurality of destination devices; and in response to the number of the plurality of destination devices exceeding the threshold, disabling feedback transmission associated with the reception by the plurality of destination devices. By flexibly allocating resources to the destination devices, it is possible to facilitate identifying destination devices that miss the data or control information and save the resource consumption.

6 Claims, 10 Drawing Sheets

Related U.S. Application Data 2019, now Pat. No. 12,028,167, which is a continuation-in-part of application No. PCT/CN2018/113534, filed on Nov. 1, 2018.

(51) Int. Cl.

| | |
|---|---|
| *H04L 5/00* | (2006.01) |
| *H04W 4/06* | (2009.01) |
| *H04W 72/02* | (2009.01) |
| *H04W 72/044* | (2023.01) |
| *H04W 72/0446* | (2023.01) |
| *H04W 72/0453* | (2023.01) |
| *H04W 72/20* | (2023.01) |
| *H04W 92/18* | (2009.01) |

(52) U.S. Cl.
CPC .............. *H04L 5/0055* (2013.01); *H04W 4/06* (2013.01); *H04W 72/02* (2013.01); *H04W 72/0446* (2013.01); *H04W 72/0453* (2013.01); *H04W 72/20* (2023.01); *H04W 72/044* (2013.01); *H04W 92/18* (2013.01)

(58) Field of Classification Search
CPC ...... H04L 1/1861; H04W 4/06; H04W 72/02; H04W 72/0446; H04W 72/0453; H04W 72/20; H04W 72/044; H04W 92/18
See application file for complete search history.

(56) References Cited

U.S. PATENT DOCUMENTS

| | | |
|---|---|---|
| 2019/0052436 A1 | 2/2019 | Desai |
| 2022/0078040 A1 | 3/2022 | Lee |

OTHER PUBLICATIONS

International search report for PCT/CN2019/075941 dated Jul. 23, 2019.

3GPP TSG RAN WG1 Meeting #94bis, R1-1810573—Chengdu, China, Oct. 8-12, 2018; Title: Support of unicast, groupcast and broadcast in NR V2X, Source: Lenovo, Motorola (Year: 2018).

RESOURCE ALLOCATION FOR FEEDBACK IN GROUPCAST COMMUNICATION

CROSS-REFERENCE TO RELATED APPLICATIONS

This application is a Continuation Application of U.S. patent application Ser. No. 17/432,784, filed on Aug. 20, 2021, which is a National Stage of International Application No. PCT/CN2019/075941 filed Feb. 22, 2019, which claims priority to International Application No. PCT/CN2018/113534 filed Nov. 1, 2018, the disclosures of which are incorporated herein in their entirety by reference.

TECHNICAL FIELD

Embodiments of the present disclosure generally relate to the field of telecommunication, and in particular, to resource allocation for feedback in groupcast communication.

BACKGROUND

Communication technologies have been developed in various telecommunication standards to provide a common protocol that enables different wireless devices to communicate on a municipal, national, regional, and even global level. An example of an emerging telecommunication standard is new radio (NR), for example, the fifth generation (5G) radio access. Device to Device (D2D) communication is being studied in communication standard groups to enable direct communication services between terminal devices. During the D2D communication, a terminal device (referred to as a source device) can transmit data to a group of D2D terminal devices (referred to as destination devices). Depending on whether the data is successfully received, the destination devices may provide feedback information to the source device. Since there are a plurality of recipients in one transmission, depending on whether the data can be successfully received, different destination devices may need to feedback different information. A communication resource allocation solution applicable for traditional cellular communication may not be suitable for use in the D2D communication.

SUMMARY

In general, example embodiments of the present disclosure provide a solution of resource allocation for feedback in groupcast communication.

In a first aspect, there is provided a method of resource allocation. The method comprises identifying a plurality of destination devices for reception of data from a source device in groupcast communication; and allocating resources to the plurality of destination devices for feedback transmission associated with the reception, the allocating comprising one of the following: allocating a first set of resources specific to a first set of destination devices and a second set of resources to be shared by a second set of destination devices, and allocating a third set of resources to be shared by the plurality of destination devices for feedback transmission.

In a second aspect, there is provided a method of resource allocation. The method comprises identifying a plurality of destination devices for reception of data from a source device in groupcast communication; in response to the number of the plurality of destination devices being below a threshold, allocating resources to the plurality of destination devices to enable feedback transmission associated with the reception by the plurality of destination devices; and in response to the number of the plurality of destination devices exceeding the threshold, disabling feedback transmission associated with the reception by the plurality of destination devices.

In a third aspect, there is provided a method of resource allocation. The method comprises receiving, by a destination device for reception of data from a source device, allocation of a set of resources for feedback transmission associated with the reception, the destination device and at least one further destination device being in groupcast communication with the source device, the set of allocated resources comprising one of the following: a first group consisting of a first resource specific to the destination device, a second set of resources to be shared with the at least one further destination device, the first and second sets of resources comprising resources allocated for feedback transmission in the groupcast communication, or a third set of resources to be shared by the plurality of destination devices for feedback transmission.

In a fourth aspect, there is provided an electronic device. The device includes a processing unit; and a memory coupled to the processing unit and storing instructions thereon, the instructions, when executed by the processing unit, causing the device to perform the method according to the first aspect.

In a fifth aspect, there is provided an electronic device. The device includes a processing unit; and a memory coupled to the processing unit and storing instructions thereon, the instructions, when executed by the processing unit, causing the device to perform the method according to the second aspect.

In a sixth aspect, there is provided an electronic device. The device includes a processing unit; and a memory coupled to the processing unit and storing instructions thereon, the instructions, when executed by the processing unit, causing the device to perform the method according to the third aspect.

In a seventh aspect, there is provided a computer readable medium having instructions stored thereon, the instructions, when executed on at least one processor, causing the at least one processor to carry out the method according to the first aspect.

In an eighth aspect, there is provided a computer readable medium having instructions stored thereon, the instructions, when executed on at least one processor, causing the at least one processor to carry out the method according to the second aspect.

In a ninth aspect, there is provided a computer readable medium having instructions stored thereon, the instructions, when executed on at least one processor, causing the at least one processor to carry out the method according to the third aspect.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
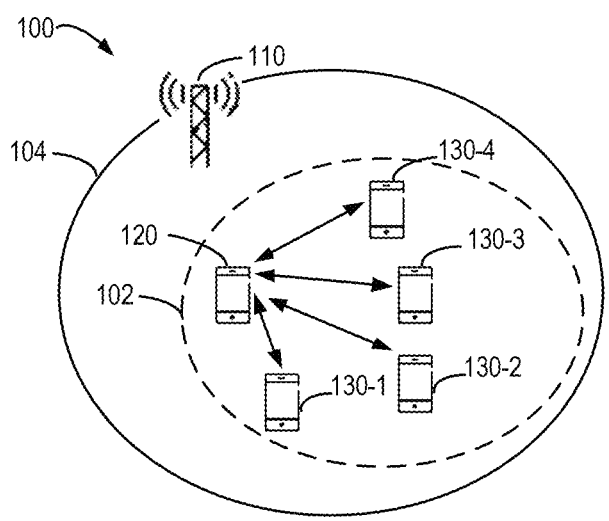
FIG. 1 is a block diagram of a communication environment in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a NodeB in new radio access (gNB) a Remote Radio Unit (RRU), a radio head (RH), a remote radio head (RRH), a low power node such as a femto node, a pico node, and the like. For the purpose of discussion, in the following, some embodiments will be described with reference to eNB as examples of the network device.

As used herein, the term "terminal device" refers to any device having wireless or wired communication capabilities. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "communication device", "terminal", "user equipment" and "UE" may be used interchangeably.

Communications discussed herein may use conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

FIG. 1 shows an example communication network 100 in which implementations of the present disclosure can be implemented. In the network 100, a plurality of terminal devices 120, 130-1 to 130-4, are capable of supporting D2D or sidelink communication with each other, which means that data and/or control information can be transmitted between the terminal devices. In the sidelink communication, a terminal device which transmits information is herein referred to as a source device, a transmitting device, a transmitter, or a sender, which terms are used interchangeably herein, and a terminal device which can receive the information is herein referred to as a destination device, a receiving device, a receiver, or a recipient, which terms are used interchangeably herein.

The sidelink communication may be classified in different types of unicast, broadcast, and groupcast/multicast, depending on the number of the destination devices or the specific targets of the transmission. An example of groupcast communication is shown in FIG. 1, where the terminal device 120 transmits data to a plurality of terminal devices 130-1 to 130-4. In this example, the terminal device 120 is a source device while the terminal devices 130-1 to 130-4 are destination devices in the groupcast communication. For purpose of discussion, the destination devices 130-1 to 130-4 are collectively or individually referred to as destination devices 130 hereinafter. The one-to-multiple communication mode as shown in FIG. 1 is also referred to as groupcast/multicast communication, and the source device 120 and all the destination devices 130 form a group 104.

Depending on whether the data from the source device 120 is successfully received, the destination devices 130 may need transmit corresponding feedback information to indicate a success or failure on the data reception. For example, negative acknowledgement (NACK) feedback may indicate a failure on the data reception while acknowledgement (ACK) feedback may indicate a success on the data reception at a destination device 130. The feedback information is especially useful for the source device 120 to determine whether to preform data retransmission, for example, in a Hybrid Automatic Repeat Request (HARQ) procedure. The resources for data transmission and feedback transmission may be allocated and indicated to the destination devices 130 in sidelink control information (SCI) so that the destination devices 130 may be aware of where to detect the data transmitted from the source device 120 and where to transmit the feedback information to the source device 120.

The network 100 is illustrated to include a network device 110 having serving coverage called as a cell 104. In the example of FIG. 1, the terminal devices 120 and 130-1 to 130-4 are shown to be within the cell 104 of the network device 110. However, in other examples, one or more of the terminal devices 120 and 130-1 to 130-4 may be out of the cell 104. The communication between the terminal devices 120 and 130-1 to 130-4 may be controlled or assisted by the network device 110. For example, the network device 110 may transmit control information related to the groupcast communication to one or more of the terminal devices 120 and 130-1 to 130-4. Thus, although not shown, the network device 110 may also communicate with one or more of the terminal devices 120 and 130-1 to 130-4.

It is to be understood that the number of network devices and terminal devices is only for the purpose of illustration without suggesting any limitations. The network 100 may include any suitable number of network devices and terminal devices adapted for implementing implementations of the present disclosure. It is also to be understood that although the terminal device 120 is illustrated as a source device and the terminal devices 130 are illustrated as destination devices in a groupcast session, any of the terminal devices 130 may become a source device if it has data to be transmitted to the other devices, and the terminal device 120 may become a destination device if it is expected to receive data from the other device. In some implementations, the devices 120 and 130 operate in a half-duplex mode and thus can either receive or transmit data at a time during D2D communication. In some other implementations, there is no half-duplex constraint on some or all of the devices 120 and 130 involved in the D2D communication.

As mentioned above, resources for the feedback transmission are needed to be allocated to a plurality of destination devices in groupcast communication with a source device. A straightforward solution is to allocate respective resources specific to the destination devices for feedback transmission. Considering the possible large number of destination devices in the groupcast communication, the resource consumption may be relatively higher, which is especially undesirable in the use case of limited available resources. In alternative solutions, if a limited number of resources are allocated for the feedback transmission, it might be challenging for the source device to identify which destination device fails to receive the data transmission. The failure of data reception at the destination device may be caused by a failure of data decoding or a miss of control information to identify when and/or where to detect the data. If no appropriate feedback is received from the destination devices, it is difficult for the source device to determine whether to retransmit the data.

According to embodiments of the present disclosure, there is prosed a solution of resource allocation for feedback in groupcast communication. In this solution, a plurality of destination devices are in groupcast communication to receive data from a source device. Resources are allocated to the plurality of destination devices for feedback transmission associated with the reception. The allocation of the resources comprise allocating a first set of resources specific to a first set of destination devices and a second set of resources to be shared by a second set of destination devices, and allocating a third set of resources to be shared by the plurality of destination devices for feedback transmission. By flexibly allocating resources to the destination devices, it is possible to facilitate identifying destination devices that miss the data or control information and save the resource consumption.

Figure 2A:
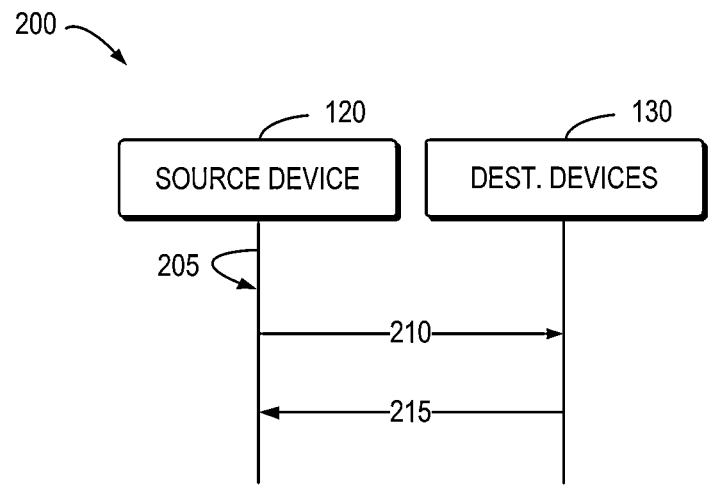
FIG. 2A is a flowchart illustrating a process of resource allocation for feedback in groupcast transmission according to an embodiment of the present disclosure.

Principle and embodiments of the present disclosure will be described in detail below with reference to FIG. 2A, which shows a process 200 of resource allocation for feedback in groupcast transmission according to an embodiment of the present disclosure. For the purpose of discussion, the process 200 will be described with reference to FIG. 1. The process 200 may involve the source device 120 and the plurality of destination devices 130 in FIG. 1. In this embodiment, the source device 120 controls the resource allocation for feedback.

The source device 120 identifies 205 a plurality of destination devices 130 for reception of data from a source device in groupcast communication. The destination devices 130, including the destination devices 130-1 to 130-4, may be discovered in a D2D discovery or communication procedure and establish a group session with the terminal device 120 for communication. In a groupcast session, the terminal device 120 is the one that has data to be transmitted while the destination devices 130 are the destinations to receive the data. As mentioned above, although four destination devices 130 are shown in FIG. 1, more or less destination devices can be included in a group session with the source device 120. The source device 120 may identify each of the destination devices 130 to which data is to be transmitted.

The source device 120 allocates 210 resources to the plurality of destination devices 130 for feedback transmission associated with the reception. The resources are allocated for the destination devices 130 to transmit feedback information related to the reception result of the data from the source device 120. In some embodiments, the resource allocation for feedback transmission may be transmitted in sidelink control information (SCI). In some embodiments, the resource allocation for feedback transmission may be indicated to the destination devices 130 together with resource allocation for data transmission, for example, in the SCI. The resource allocation may be indicated to the destination devices 130 using physical layer signaling dynamically or using higher layer signaling semi-statically.

In embodiments of the present disclosure, there are several manners for the source device 120 to allocate the resources for feedback transmission. In some embodiments, one or more specific resources are allocated to one or more specific destination devices 130 while one or more other resources are shared by other destination devices 130. In further embodiments, different resources are allocated for transmission of different types of feedback information (for example, NACK feedback and ACK feedback), and the different resources are shared by a plurality of destination devices 130. In further embodiments, different resources are allocated for transmission of NACK feedback associated with the reception of different portions of the data. As used herein, different resources may be resources that are not overlapped in at least one of a time domain, a frequency domain, and a code domain. The above embodiments will be described in detail below.

Each of the destination devices 130 is allocated with a set of resources which are specific to this destination device or is to be shared with one or more other destination device 130 for one or more types of feedback transmission. Depending on the allocated resources and reception status of the data, the destination devices 130 perform 215 feedback transmission to the source device 120. The destination devices 130 attempt to detect the data from the source device 120 on certain resources. Depending on whether the resources on which the data is detected is correct and/or whether a signal(s) detected on the resources can be successfully decoded, one or more of the destination devices 130 may successfully receive or fail to receive part or all of the data. Thus, the reception status of the data includes successful reception status or failed reception status.

ACK feedback may be used to indicate the successful reception at a destination device while NACK feedback may be used to indicate the failed reception at a destination device. In some embodiments of groupcast transmission, a specific signal may be specified to indicate ACK feedback, and a different specific signal may be specified to indicate NACK feedback. For example, the specific signal feedback by each of the destination devices 130 may specify the received energy or power of the data. Depending on the received energy or power, the source device 120 may determine whether the data is successfully received or not.

The allocated (specific or shared) resources may comprise one or more resources for transmission of one or both of ACK feedback and NACK feedback. Thus, if a destination device 130 in the groupcast communication fails to detect the data from the source device 120 and the allocated resources comprise a resource(s) for NACK feedback transmission in the failed reception status, it may transmit the NACK feedback to the source device 120 using the allocated resource(s). If a destination device 130 in the groupcast communication successfully detects all the data from the source device 120 and the allocated resources comprise a resource(s) for ACK feedback transmission in the successful reception status, it may transmit the ACK feedback to the source device 120 using the allocated resource(s).

In some embodiments, the source device 120 may retransmit the data if any one of the destination devices 130 fails to successfully receive the data. Thus, NACK feedback is an important factor for the source device 120 to decide whether or not data retransmission is required. In resource allocation, one or more resources may be allocated to some or all of the destination devices 130 for NACK feedback transmission only. In this case, if these destination devices 130 successfully detect all the data from the source device 120, no feedback information is needed to be transmitted.

Figure 2B:
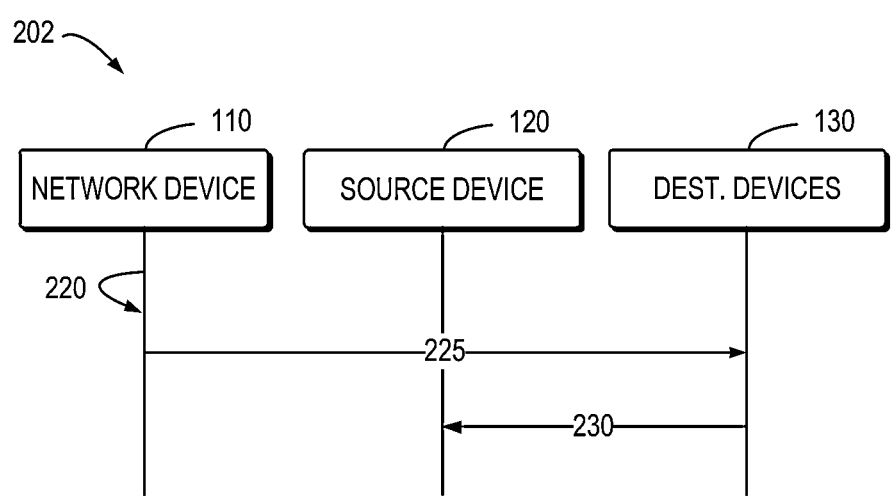
FIG. 2B is a flowchart illustrating a process of resource allocation for feedback in groupcast transmission according to a further embodiment of the present disclosure.

The process of resource allocation controlled by the source device 120 has been described above. In some other embodiments, the resource allocation may be controlled by the network device 110 where the source device 120 and the destination devices 130 are located. FIG. 2B illustrates a process 202 of resource allocation for feedback in groupcast transmission according to an embodiment of the present disclosure. For the purpose of discussion, the process 202 will be described with reference to FIG. 1. The process 202 may involve the network device 110, the source device 120 and the plurality of destination devices 130 in FIG. 1.

In the process 202, the network device 110 controls the resource allocation for feedback transmission by the destination devices 130. The network device 110 identifies 220 the plurality of destination devices 130 for reception of data from the source device 120 in groupcast communication. The destination devices 130 may be determined for example by information provided from the source device 120. In some embodiments, the groupcast communication is under control of or is assisted by the network device 120. Thus, the network device 120 has such information about which devices 120 are involved in the groupcast communication for data reception.

The network device 110 allocates 225 resources to the plurality of destination devices for feedback transmission associated with the reception. The resource allocation performed by the network device 110 may be similar to that performed by the source device 120, as described above and as will be discussed in detail in the following. The resource allocation may be directly indicated to the destination devices 130 by the network device 110, as shown in FIG. 2B, or may be first transmitted to the source device 120 to forward to the destination devices 130.

With the resources allocated for feedback transmission in the groupcast communication with the source device 120, the destination devices 130 perform 230 feedback transmission based on the allocated resources and reception status of the data. Regardless of which device controls the resource allocation, the feedback transmission at the respective destination devices 130 is the same.

Some general processes of resource allocation for feedback in groupcast transmission have been described above. It would be appreciated that in some other embodiments, the resource allocation may be controlled by other entities in the communication network 100 other than the network device 110 and the source device 120. The scope of the embodiments of the present disclosure is not limited in this regard. Some detailed embodiments of the resource allocation in either the process 200 or the process 202 will be discussed in the following.

As mentioned above, in some embodiments, specific resources are allocated for some destination devices 130 and shared resources are allocated for some other destination devices 130. More specifically, a first set of resources are allocated as being specific to a first set of destination devices 130 and a second set of resources are allocated to be shared by a second set of destination devices 130. Each of the destination devices 130 in the first set may have one or more specific resources, which may be referred to as a device-specific resource(s). A device-specific resource can only be used by the specific destination device 130 and may be used for transmission of either ACK feedback or NACK feedback.

Each of the shared resources in the second set can be used by any of the second set of destination devices 130. The shared resources may be used for transmission of a type of feedback information by the second set of destination devices 130. That is, the resources in the second set are specific to a type of the feedback information but are shared by the destination devices 130. For example, the shared resources may be allocated for NACK feedback transmission only. In other cases, the destination devices 130 may transmit ACK feedback only on the shared resource. By allocating one or more shared resources, the total number of allocated resources is not larger than the number of destination devices 130 in the group 102.

The first set of resources and the second set of resources may not be non-overlapped with each other in at least one of the time domain, frequency domain, and code domain. In some embodiments, resources within the first or second set may be partially or totally overlapped in one or more of the time, frequency, and code domains. In some embodiments, the second set of shared resources may be in a single time slot. The first set of resources may be in a single time slot.

In some embodiments, the number of the resources to be allocated (referred to as a first number hereinafter) may be configurable. In an embodiment, the first number of the allocated resources may be determined based on available resources for the groupcast communication. The resource pool for the groupcast communication may depend on the time, frequency, and/or code resources allowed to be used. The available resources in the resource pool may also be varied over time. If more resources are available in the resource pool, a larger number of allocated resources may be allocated; otherwise, a smaller number of allocated resources may be allocated. In a further embodiment, the first number of the allocated resources may be configured per groupcast session. In some embodiments, the first number of the device-specific resources may be pre-configured for a resource pool.

In some embodiments, the number of device-specific resources in the first set (referred to as a second number hereinafter) may be configurable and may be determined based on the first number of the resources to be allocated. In an example, a certain portion of the resources to be allocated may be used as device-specific resources. Alternatively, a predetermined number of the resources to be allocated may be used as shared resources while the remaining resources can thus be used as device-specific resources.

If one specific resource is to be allocated to one destination device 130 for both ACK and NACK feedback, the number of the destination devices in the first set is the same as the first number of device-specific resources. It is also possible that more than one specific resource is to be allocated to one destination device 130 for different types of feedback, and the number of the destination devices in the first set may also be determined accordingly based on the first number of device-specific resources.

Figure 3A:
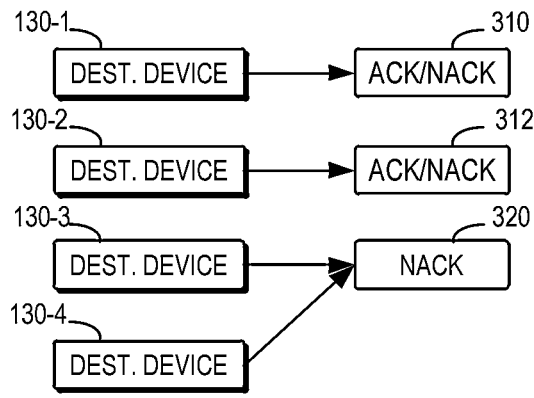
FIGS. 3A to 3F are schematic diagrams illustrating resource allocation for feedback in groupcast transmission according to some embodiment of the present disclosure.

In some embodiments, a single resource is to be allocated to as a shared resource. If it is configured that R different resources are to be allocated for feedback transmission, in an example, (R−1) resources may be allocated as device-specific resources for (R−1) destination devices 130. The remaining one resource may be shared by other destination device 130 or by all destination devices 130. FIG. 3A shows such an example, where resources 310 and 312 are allocated to be specific to the destination devices 130-1 and 130-2 for transmission both ACK and NACK feedback. The remaining resource 320 is allocated to be shared by the remaining destination devices 130-3 and 130-4. If one or both of the destination devices 130-3 and 130-4 fail to receive the data from the source device 120, they may select the transmit NACK feedback using the shared resource 320.

Figure 3B:
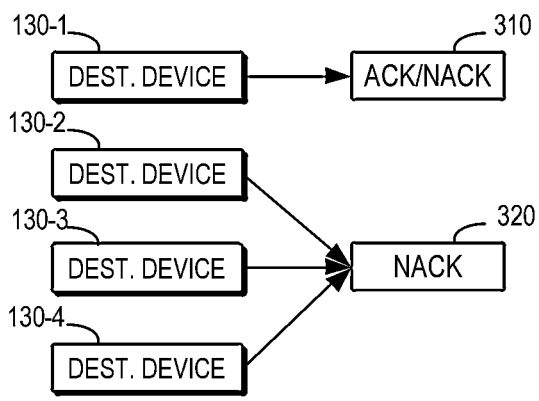
Figure 3C:
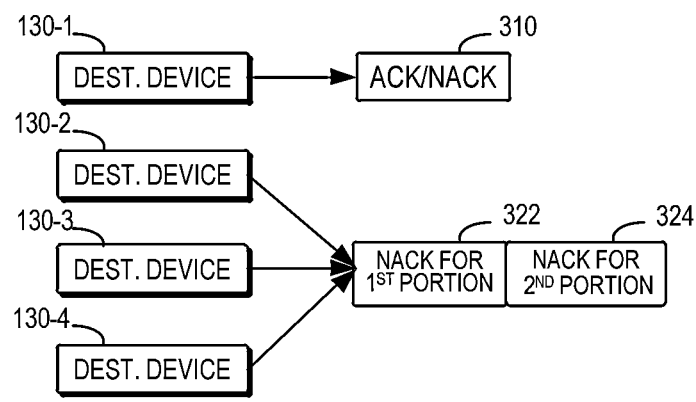
Figure 3D:
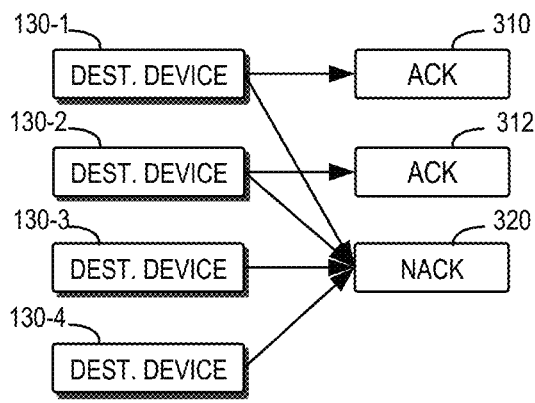

FIG. 3D shows another example, where resources 310 and 312 are allocated to be specific to the destination devices 130-1 and 130-2 for transmission only ACK. The remaining resource 320 is allocated to be shared by all the destination devices 130-1, 130-2, 130-3 and 130-4. If any of the destination devices 130-1, 130-2, 130-3 and 130-4 fails to receive the data from the source device 120, they may select the transmit NACK feedback using the shared resource 320. The R resources may not be overlapped in at least one of the time domain, frequency domain, and code domain, e.g. the R resources can be codes generated from one Computer Generated Sequence (CGS) with different cyclic shift values, or the R resources can be codes generated from different CGS's, or both the above.

In some embodiments, instead of changing the number of the resources to be allocated, the number of the device-specific resources in the first set and/or the number of the shared resources in the second set may be predetermined and fixed. In some examples, each of the two numbers may be larger than or equal to one. To further reduce the resource consumption, in a specific example, a single device-specific resource may be included in the first set to be allocated to a destination device 130. Alternatively, or in addition, a single resource may be included in the second set to be allocated to the remaining destination devices 130 or all destination devices 130. For example, as shown in FIG. 3B, only the resource 310 is allocated to be specific to the destination device 130-1 for NACK/ACK feedback transmission, the resource 320 is shared by the destinations 130-2 to 130-4 in the group 102.

Figure 3E:
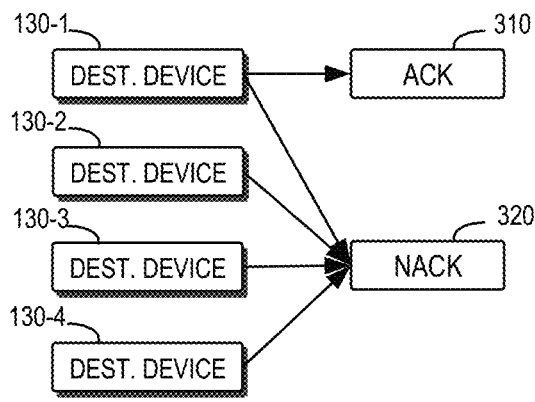

FIG. 3E shows another example, where only the resource 310 is allocated to be specific to the destination device 130-1 for ACK feedback transmission, and the resource 320 is shared by the destinations 130-1 to 130-4 in the group 102. The resources 310 and 320 may not be overlapped in at least one of the time domain, frequency domain, and code domain, e.g. the resources can be codes generated from one Computer Generated Sequence (CGS) with different cyclic shift values, or the R resources can be codes generated from different CGS's, or both the above.

In some other embodiments, the second set of shared resources may comprise different resources for feedback transmission associated with the reception of different portions of the data. It is possible that one or some of the portions of the data cannot be received successfully at certain destination device 130. Thus, different resources in the second set may be specific for feedback transmission on different portions of the data. The number of the resources in the second set may be determined based on the number of the portions of data on which specific feedback can be provided. In some embodiments, the different portions include different code words. The source device 120 may encode and transmit the data as different code words to the destination devices 130 in the group 102. In an example of D2D communication, two code words are generally transmitted.

The shared resources in the second set may be allocated for a specific type of feedback information to indicate the reception status of the specific portion of the data. FIG. 3C shows such an example, where in addition to the device-specific resource 310 allocated to the destination device 130-1, a resource 322 is allocated for NACK feedback transmission associated with the reception of a first code word for the data, and a resource 324 is allocated for NACK feedback transmission associated with the reception of the second code word for the data. The resources 322 and 324 are shared by the destination devices 130-2 to 130-4.

Figure 3F:
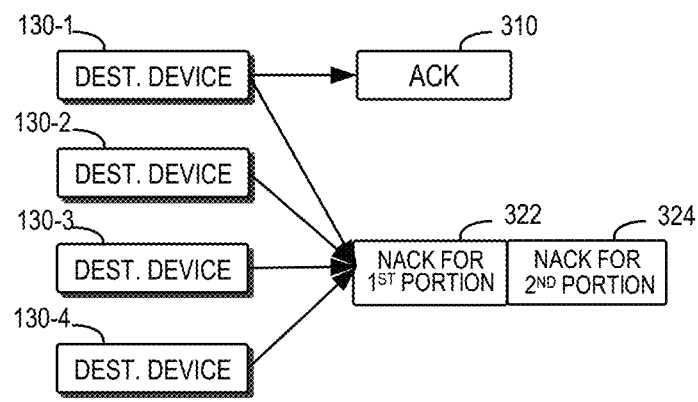

FIG. 3F shows another example, where in addition to the device-specific resource 310 allocated to the destination device 130-1 only for ACK feedback, a resource 322 is allocated for NACK feedback transmission associated with the reception of a first code word for the data, and a resource 324 is allocated for NACK feedback transmission associated with the reception of the second code word for the data. The resources 322 and 324 are shared by the destination devices 130-1 to 130-4. At least one of the resources 310, 322, and 324 is not overlapped with the other resources in at least one of the time domain, the frequency domain, and the code domain, e.g. the resources can be codes generated from one Computer Generated Sequence (CGS) with different cyclic shift values, or the R resources can be codes generated from different CGS's, or both the above.

For each of the destination devices 130-2 to 130-4, if this destination device fails to successfully decode the first code word on a data channel, NACK feedback, such as a first specific signal, may be transmitted on the resource 322. If the destination device fails to successfully decode the second code word, NACK feedback, such as a second specific signal, may be transmitted on the resource 324. The same or different signals for NACK feedback may be transmitted on the resources 322 and 324 by a destination device 130.

In the embodiments discussed above, a specific number of destination devices 130 in the first set may be allocated with device-specific resources. The source device 120 or the network device 110 may select the first set of destination devices 130 from the group 102 in a random manner or by taking some impact factors into consideration. In some embodiments, the first set of destination devices 130 may be selected from the group 102 based on distances between the destination devices 130 and the source device 120. The first set of destination devices 130 may have larger distances than the remaining destination devices 130 in the second set. Thus, the longer the distance of a destination device 130 is from the source device 120, the higher the probability that the destination device 130 can be allocated with a specific resource for feedback transmission. In some embodiments where a single device-specific resource is allocated, a single destination device 130 having a relatively large distance or the largest distance may be selected.

Alternatively, or in addition, the first set of destination devices 130 may be selected based on qualities of links between the destination devices 130 and the source device 120. The first set of destination devices 130 may have worse channel status than the remaining destination devices 130 in the second set. Thus, the worse the channel status of a destination device 130 is, the higher the probability that the destination device 130 can be allocated with a specific resource for feedback transmission. The qualities of links may be measured based on varies factors, including but not limited to, a Reference Signal Received Power (RSRP), a Signal to Noise Ratio (SNR), a Signal to Interference plus Noise Ratio (SINR), and other measurement factors related to the transmission channel between the destination devices 130 and the source device 120. These factors may be measured and quantified to indicate the qualities of the links.

In some embodiments where a single device-specific resource is allocated, a single destination device 130 having a relatively lower quality or the lowest quality may be selected.

In some embodiments, for each of the first set of destination devices 130, such as the destination device 130-1 or 130-2 in the example of FIG. 3A, in addition to transmit the NACK or ACK feedback to the source device 120, the destination device 130 may further transmit an indication indicating a quality of a link between that destination device 130 and the source device 120. In some examples, the indication may indicate a specific quality of a control channel for carrying the control information, such as the resource allocation for the data transmission, to that destination device 130. The control channel may be a Physical Shared Control Channel (PSCCH) or any other control channel over which the control information can be transmitted. In some embodiments, the indication may be transmitted together with the feedback using the device-specific resource.

The quality of the link may be helpful for the source device 120 to determine the reason of no NACK feedback on the second set of shared resources. For example, if the quality of the link is indicated to be low, for example, lower than a predetermined threshold, the source device 120 may determine therefrom that since the destination device 130 with a link of a low quality has successfully received the resource allocation for data reception and feedback transmission, other destination devices 130 may have a high probability of having received the resource allocation. Thus, it may be indirectly indicated that all the second set of destination devices 130 have successfully received the data and thus have no need to transmit the NACK feedback. In some other cases, the quality of the link is indicated to be high, for example, higher than the predetermined threshold, it has a higher probability that some of the destination devices 130 may fail to receive the resource allocation for data reception and/or feedback transmission, and thus is capable of transmitting any feedback using the second set of shared resources. To ensure the successful data reception, the source device 120 may retransmit the data later.

In some embodiments, the second set of destination devices 130, such as the destination device 130-3 or 130-4 in the example of FIG. 3A, may use the second set of shared resources in a frequency-multiplexed mode. The second set of shared resources may be divided into a number of subsets of resources in a frequency domain and then each destination device 130 in the second set may select one of the subsets of resources to transmit the feedback information. The number of the subsets may be preconfigured, for example, by the source device 120 or the network device 110.

In an embodiment, one of the subsets of resources may be selected by a destination device 130 in the second set based on a predefined index assigned to this destination device 130 and the number of the subsets of resources. As an example, all the destination devices 130 in the group 102 are assigned with predefined indices, for example, from 0 to M. It is supposed that the second set of resources are divided into S subsets each being indexed from 0 to S−1, a destination device 130 in the second set with an index of m may select a subset with an index equal to mod (m, S). In this way, it is possible to avoid crowed feedback transmission in certain subsets. It would be appreciated that the subset of resources to be used by the destination device 130 may be selected in other manners based on the index of the destination device 130 and the number of the subsets of resources. In other embodiments, each of the destination devices 130 in the second set may randomly select one of the subset of resources.

In resource allocation, as an alternative to allocating both device-specific and shared resources, one set of resources (referred to as a third set of resources) may be allocated to be shared by all the destination devices 130 in the group 103.

In some embodiments, the third set of resources includes different resources for transmissions of different types of feedback information. Particularly, one or more resources may be allocated for NACK feedback transmission, and one or more other resources may be allocated for ACK feedback transmission. In the time domain, the resource(s) allocated for NACK feedback transmission may precede the resource(s) allocated for ACK feedback transmission. As such, the source device 120 may always first detect whether NACK feedback is received. Since detection of any NACK feedback may trigger data retransmission, the source device 120 may not need to detect the feedback information in the following resources later if the NACK feedback is detected in the third set of preceding resources, which may save the costs for signal detection and computing at the source device 120.

Figure 4A:
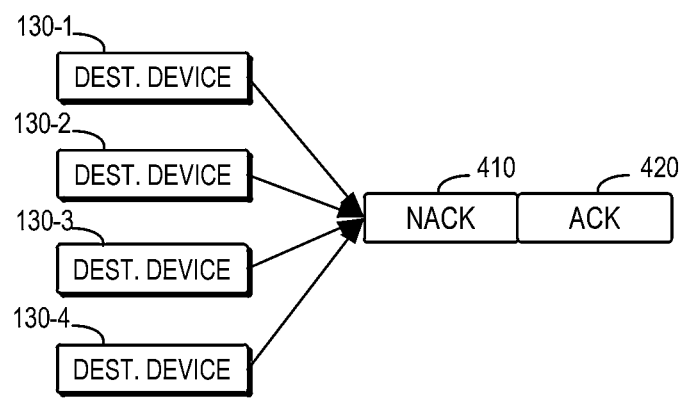
FIGS. 4A to 4B are schematic diagrams illustrating resource allocation for feedback in groupcast transmission according to some other embodiment of the present disclosure.

In an embodiment, in the third set of resources, a single resource may be allocated for NACK feedback transmission, another resource may be allocated for ACK feedback transmission. FIG. 4A shows such embodiment, where a resource 410 is shared by the destination devices 130-1 to 130-4 for NACK feedback transmission, and a resource 420 is shared by the destination devices 130-1 to 130-4 for ACK feedback transmission.

In another embodiment, different resources may be allocated in the third set for feedback transmission associated with the reception of different portions of the data. Thus, different resources in the second set may be specific for feedback transmission on different portions of the data. The number of the resources in the third set may be determined based on the number of the portions of data on which specific feedback can be provided. As described above, the different portions include different code words. The source device 120 may encode and transmit the data as different code words to the destination devices 130 in the group 102.

Figure 4B:
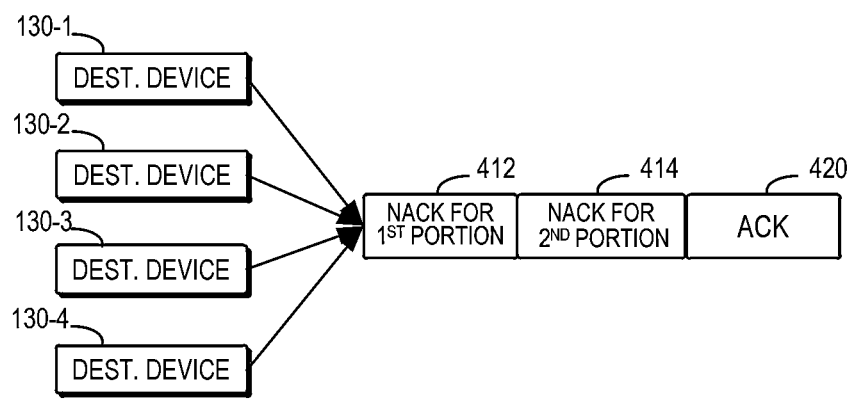

In an example of D2D communication, two code words are generally transmitted. Thus, two resources may be allocated in the third set, each for NACK feedback transmission on one of the two code words. FIG. 4B shows that two resources 412 and 414 are allocated for NACK feedback transmission associated with the reception of a first code word and a second code word for the data, respectively. Both the resources 412 and 414 are in a time slot prior to the resource 420.

For each of the destination devices 130-1 to 130-4, if this destination device fails to successfully decode the first code word on a data channel, NACK feedback, such as a first specific signal, may be transmitted on the resource 412. If the destination device fails to successfully decode the second code word, NACK feedback, such as a second specific signal, may be transmitted on the resource 414. The same or different signals for NACK feedback may be transmitted on the resources 412 and 414 by a destination device 130.

In some embodiments, since the third set of resources is shared by the destination devices 130, these destination devices 130 can use the third set of resources for feedback transmission. More specifically, the third set of shared resources may be divided into a number of subsets of resources in a frequency domain. A destination device 130 may select one of the subsets of resources to transmit NACK feedback if needed. The number of the subsets for division may be preconfigured, for example, by the source device 120 or the network device 110.

In an embodiment, a subset of resources may be selected by each destination device 130 based on a predefined index assigned to this destination device 130 and the number of the subsets of resources. As an example, all the destination devices 130 in the group 102 are assigned with predefined indices, for example, from 0 to M. It is supposed that the third set of resources are divided into S subsets each being indexed from 0 to S−1, a destination device 130 with an index of m may select a subset with an index equal to mod (m, S). In this way, it is possible to avoid crowed feedback transmission in certain subsets. It would be appreciated that the subset of resources to be used by the destination device 130 may be selected in other manners based on the index of the destination device 130 and the number of the subsets of resources. In other embodiments, each of the destination devices 130 may randomly select one of the subset of resources.

In some embodiments where different resources in the third set are allocated for NACK feedback transmission associated with reception of different portions of the data, the resources may be divided per portion of the data. For example, the resource 412 and the resource 414 are divided into a first number of subsets of resources and a second number of subsets of resources, respectively, in a frequency domain. A destination device 130 may select one of the first number of subsets for transmitting NACK feedback if this device fails to receive the first portion, and select one of the second number of subsets for transmitting NACK feedback if this device fails to receive the second portion.

Figure 5A:
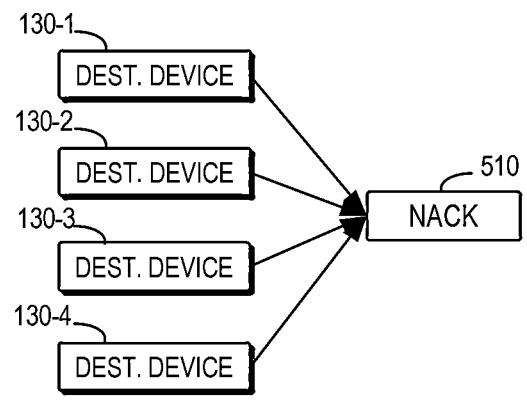
FIGS. 5A to 5B are schematic diagrams illustrating resource allocation for feedback in groupcast transmission according to some further embodiment of the present disclosure.
Figure 5B:
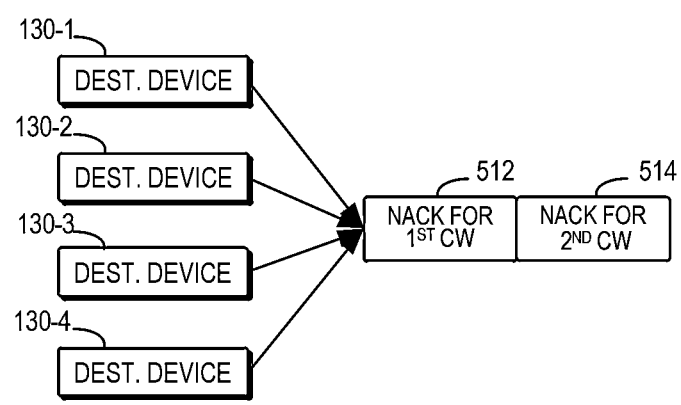

In some embodiments, the third set of resources may only include one or more resources for NACK feedback transmission. In an example as shown in FIG. 5A, the third set of resources may include only one resource 510 to be shared by the destination devices 130-1 to 130-4 for NACK feedback transmission. In another example, the third set of resources may include different resources for feedback transmission associated with the reception of different portions of the data. As shown in FIG. 5B, a resource 512 and a resource 514 allocated for NACK feedback transmission associated with the reception of a first code word and a second code word for the data, respectively. The third set of shared resources specific for NACK feedback transmission only may also be used.

Figure 6A:
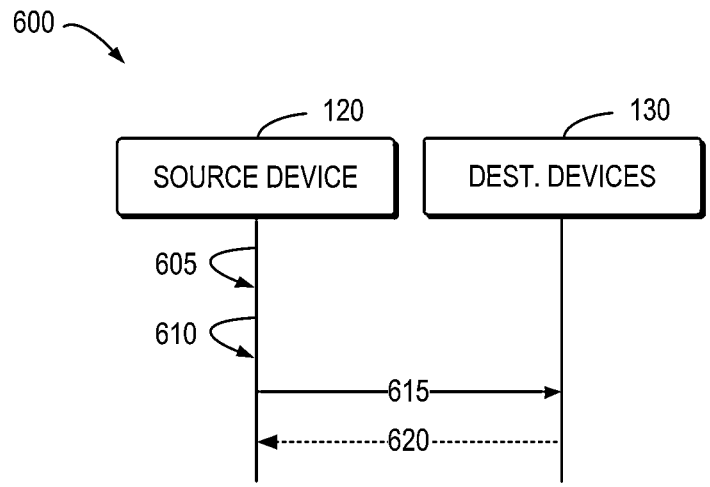
FIG. 6A is a flowchart illustrating a process of resource allocation for feedback in groupcast transmission according to an embodiment of the present disclosure.

In some embodiments where the number of the resources to be allocated can be varied, the source device 120 or the network device 110 may control the enablement or disablement of the feedback transmission. FIG. 6A shows a flowchart illustrating a process 600 of resource allocation for feedback in groupcast transmission according to a further embodiment of the present disclosure. For the purpose of discussion, the process 200 will be described with reference to FIG. 1. The process 200 may involve the source device 120 and the plurality of destination devices 130 in FIG. 1. In this embodiment, the source device 120 controls the resource allocation for feedback.

The source device 120 identifies 605 a plurality of destination devices 130 for reception of data from a source device in groupcast communication. The identification of the destination devices is similar as described in the process 200 and is not repeated here for brevity.

The source device 120 determines 610 whether the number of the plurality of destination devices 130 exceeds a threshold. If it is determined that the number is below the threshold, the source device 120 allocates 615 resources to the plurality of destination devices 130 to enable feedback transmission associated with the reception by the plurality of destination devices 130. Otherwise, the source device 120 disables 615 feedback transmission associated with the reception by the plurality of destination devices 130.

Figure 7:
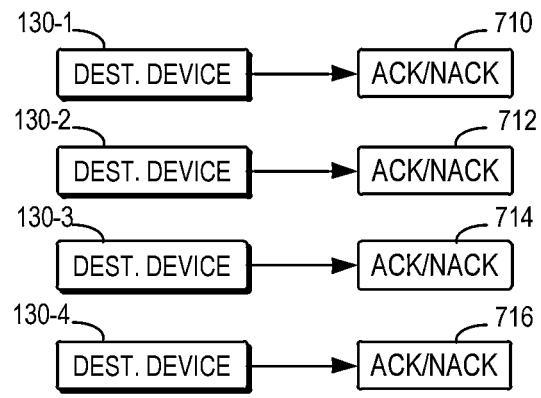
FIG. 7 is a schematic diagram illustrating resource allocation for feedback in groupcast transmission according to some further embodiment of the present disclosure.

The number of the destination devices 130 in groupcast communication may be varied. This number of the destination devices 130 will impact on the resource allocation especially when the number of resources to be allocated is based on the number of the destination devices 130. In some cases, a set of resources will be allocated to be specific to the plurality of destination devices 130, that is, each of the destination devices 130 in the group 102 has one or more specific resources. Thus, the number of resource to be allocated is based on the number of the plurality of destination devices 130, and may be varied depending on the groupcast communication in different groupcast sessions. FIG. 7 shows an example where each of the destination devices 130-1 to 130-4 has one specific of the resources 710, 712, 714, and 716.

As the number of the destination devices 130 in the group 102 increases, more specific resource may be allocated for the feedback transmissions. To limit the resource consumption, in the cases where the number of destination devices 130 exceeds the threshold, no feedback transmission is enabled in the groupcast communication. The threshold may be any predetermined value configured by the source device 120 or the network device 130. The threshold may also be configured based on the available resources for the groupcast communication.

In the embodiments where specific resources are allocated for all the destination devices 130, the allocated resources may be indicated to the destination devices 130 by indices of the destination devices and a location of a resource allocated to a reference destination device 130. More specifically, the plurality of destination devices 130 are assigned with unique indices in a sequence, respectively. For example, the destination devices 130 each may be indexed from 0 to M. The source device 120 may indicate a location of a resource of the allocated resources specific to a reference destination device 130 among the plurality of destination devices 130. The reference destination device 130 may be the one having the first or last index in the sequence. Respective locations of other resources than the resource may be determined based on the location of the resource and the unique indices of the other destination devices. In these embodiments, the locations of the allocated resources are consecutive in the time, frequency, or code domain.

For example, if a location of the n-th resource is indicated to be a resource for a 0-th reference destination device 130, a resource allocated to the m-th destination device 130 may be determined as the (n+m) resource, and the location of the (n+m) resource may be determined based on the offset between two adjacent resources.

In the case that the number of the destination devices 130 is below the threshold, the destination devices 130 may be allocated with resources for the feedback transmission, and may perform 620 the feedback transmission to the source device 120 based on the set of allocated resources and reception status of the data. The feedback transmission performed at the destination devices 130 has been discussed above and will not be repeated here for purpose of brevity.

Figure 6B:
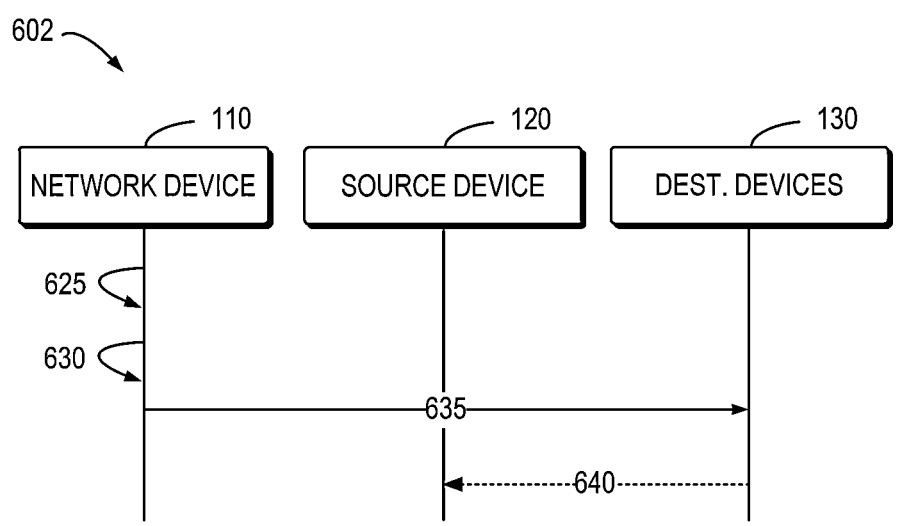
FIG. 6B is a flowchart illustrating a process of resource allocation for feedback in groupcast transmission according to a further embodiment of the present disclosure.

FIG. 6B shows a flowchart illustrating a process 602 of resource allocation for feedback in groupcast transmission according to a further embodiment of the present disclosure. For the purpose of discussion, the process 602 will be described with reference to FIG. 1. The process 602 may involve the network device 110, the source device 120 and the plurality of destination devices 130 in FIG. 1. The difference between the process 600 and the process 602 is that the network device 110 controls the resource allocation and enablement/disablement of the feedback transmission in the groupcast communication.

The network device 110 identifies 625 a plurality of destination devices 130 for reception of data from a source device in groupcast communication. The identification of the destination devices is similar as described in the process 200 and is not repeated here for brevity.

The network device 110 determines 630 whether the number of the plurality of destination devices 130 exceeds a threshold. If it is determined that the number is below the threshold, the network device 110 allocates 635 resources to the plurality of destination devices 130 to enable feedback transmission associated with the reception by the plurality of destination devices 130. Otherwise, the network device 110 disables 635 feedback transmission associated with the reception by the plurality of destination devices 130.

The resource allocation and enablement/disablement of the feedback transmission in the process 602 is similar to those in the process 600 except that it is the network device 110 that performs the functionalities.

In the case that the number of the destination devices 130 is below the threshold, the destination devices 130 may be allocated with resources for the feedback transmission, and may perform 640 the feedback transmission to the source device 120 based on the set of allocated resources and reception status of the data. The feedback transmission performed at the destination devices 130 has been discussed above and will not be repeated here for purpose of brevity.

Figure 8:
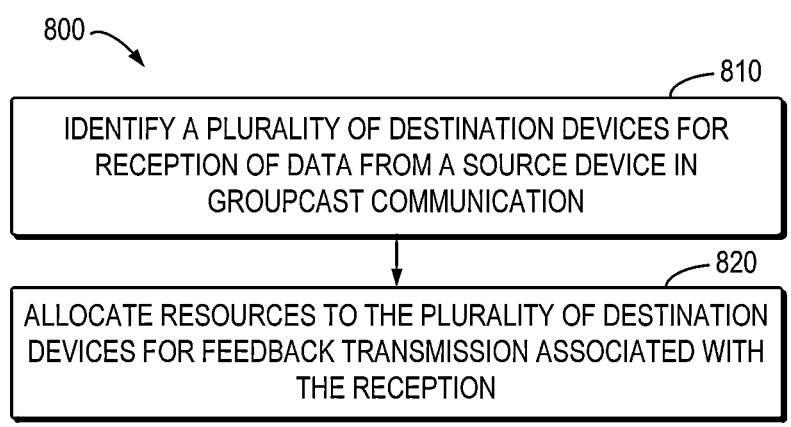
FIG. 8 is a flowchart illustrating a process of resource allocation for feedback according to an embodiment of the present disclosure.

FIG. 8 shows a flowchart of an example method 800 in accordance with some embodiments of the present disclosure. The method 800 can be implemented at the source device 120 or the network device 110 as shown in FIG. 1.

At block 810, a plurality of destination devices are identified for reception of data from a source device in groupcast communication. At block 820, resources are allocated to the plurality of destination devices for feedback transmission associated with the reception. The allocating comprises one of the following: allocating a first set of resources specific to a first set of destination devices and a second set of resources to be shared by a second set of destination devices, and allocating a third set of resources to be shared by the plurality of destination devices for feedback transmission.

In some embodiments, a first number of the allocated resources is configurable, and a second number of the resources in the first set is determined based on the first number.

In some embodiments, the first set of destination devices are selected from the plurality of destination devices based on at least one of the following: distances between the plurality of destination devices and the source device, and qualities of links between the plurality of destination devices and the source device.

In some embodiments, the first set of resources comprises a single resource.

In some embodiments, the first set of resources are allocated for acknowledgement (ACK) feedback transmission.

In some embodiments, the second set of resources are allocated for negative acknowledgement (NACK) feedback transmission.

In some embodiments, the second set of resources or the third set of resources comprise different resources to be shared by the plurality of destination devices for feedback transmission associated with the reception of different portions of the data.

In some embodiments, the first set of resources and the second set of resources are non-overlapped with each other in at least one of the time domain, frequency domain, and code domain.

In some embodiments, the third set of resources are divided into a number of subsets of resources in a frequency domain, the subsets of resources being selected by the second set of the destination devices based on predefined indices of the second set of destination devices and the number of the subsets.

In some embodiments, the third set of resources comprises different resources for transmissions of different types of feedback information.

Figure 9:
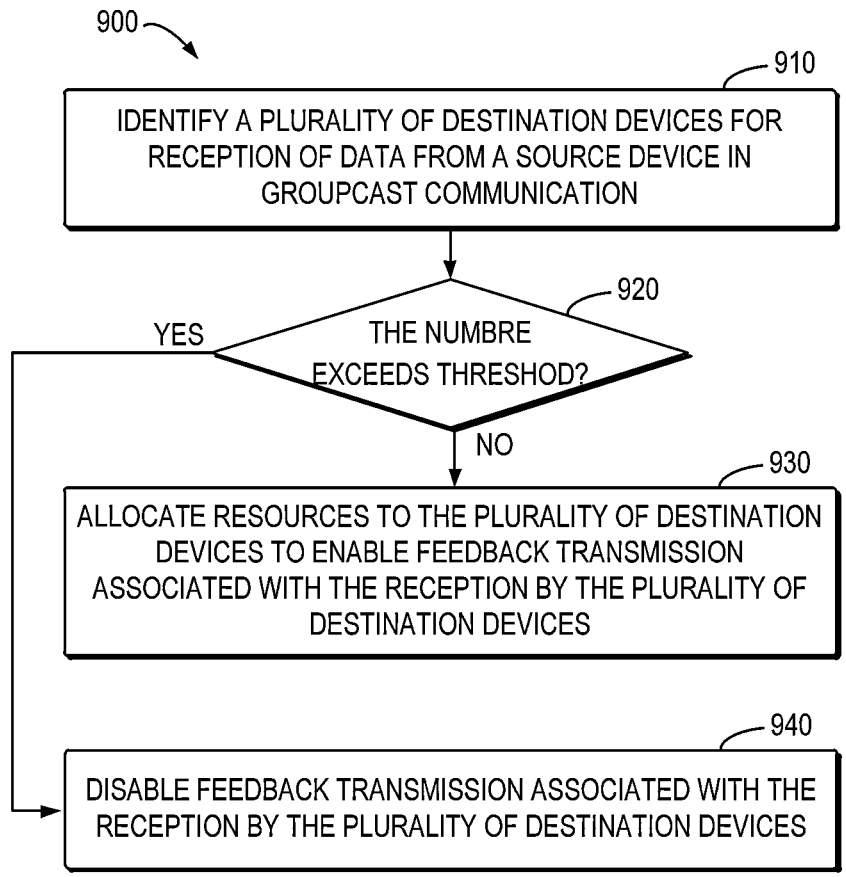
FIG. 9 is a flowchart illustrating a process of resource allocation for feedback according to another embodiment of the present disclosure.

FIG. 9 shows a flowchart of an example method 900 in accordance with some other embodiments of the present disclosure. The method 900 can be implemented at the source device 120 or the network device 110 as shown in FIG. 1.

At block 910, a plurality of destination devices are identified for reception of data from a source device in groupcast communication. At block 920, it is determined whether the number of the plurality of destination devices exceeds a threshold. If it is determined that the number of the plurality of destination devices is below a threshold, at block 930, resources are allocated to the plurality of destination devices to enable feedback transmission associated with the reception by the plurality of destination devices. If it is determined that the number of the plurality of destination devices exceeds the threshold, feedback transmission associated with the reception by the plurality of destination devices is disabled at block 940.

In some embodiments, the allocating comprises: allocating a set of resources specific to the plurality of destination devices based on the number of the plurality of destination devices.

In some embodiments, the plurality of destination devices are assigned with unique indices in a sequence, respectively, and wherein the allocating comprises: indicating a location of a resource of the allocated resources specific to a reference destination device of the plurality of destination devices, respective locations of other resources than the resource being determined based on the location of the resource and the unique indices of the other destination devices.

Figure 10:
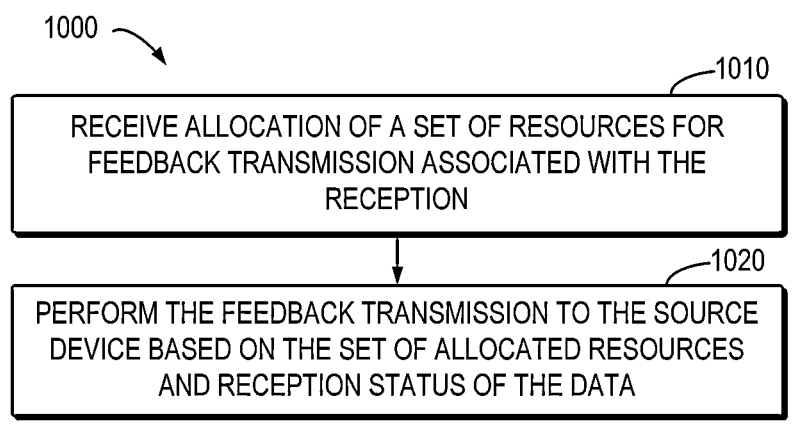
FIG. 10 is a flowchart illustrating a process of resource allocation for feedback according to a further embodiment of the present disclosure.

FIG. 10 shows a flowchart of an example method 1000 in accordance with some embodiments of the present disclosure. The method 1000 can be implemented at the destination device 130 as shown in FIG. 1.

At block 1010, the destination device 130 receives allocation of a set of resources for feedback transmission associated with the reception, the destination device and at least one further destination device being in groupcast communication with the source device, the set of allocated resources comprising one of the following: a first resource specific to the destination device, a second set of resources to be shared with the at least one further destination device, the first and second sets of resources comprising resources allocated for feedback transmission in the groupcast communication, or a third set of resources to be shared by the plurality of destination devices for feedback transmission. At block 1020, the destination device 130 performs the feedback transmission to the source device based on the set of allocated resources and reception status of the data.

In some embodiments, the set of allocated resources comprises the first resource specific to the destination device, the method further comprising: transmitting to the source device an indication indicating a quality of a link between the destination device and the source device.

In some embodiments, the first resource is allocated for acknowledgement (ACK) feedback transmission.

In some embodiments, the second set of resources are allocated for negative acknowledgement (NACK) feedback transmission.

In some embodiments, the second set of resources or the third set of resources comprise different resources to be shared with the at least one further destination device for NACK feedback transmission associated with the reception of different portions of the data.

In some embodiments, the first resource and the second set of resources are non-overlapped with each other in at least one of a time domain, frequency domain, and code domain.

In some embodiments, the third set of resources are divided into a number of subsets of resources in a frequency domain, the subsets of resources being selected by the second set of the destination devices based on predefined indices of the second set of destination devices and the number of the subsets.

In some embodiments, the third set of resources comprises different resources for transmissions of different types of feedback information.

Figure 11:
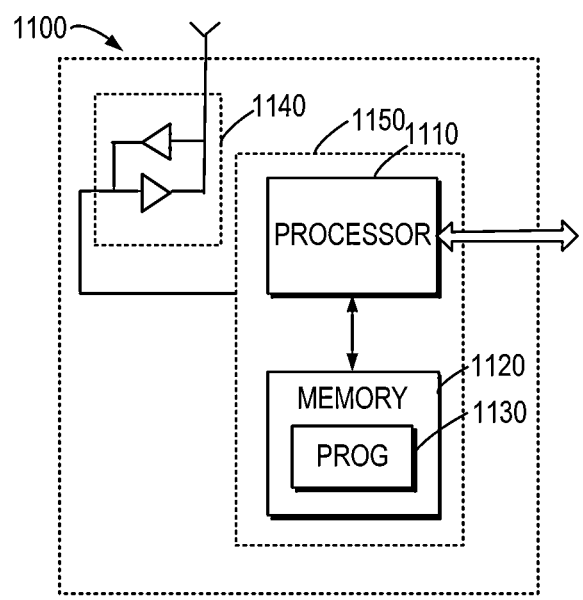
FIG. 11 is a simplified block diagram of a device that is suitable for implementing embodiments of the present disclosure.

FIG. 11 is a simplified block diagram of a device 1100 that is suitable for implementing embodiments of the present disclosure. The device 1100 can be considered as a further example implementation of the network device 110, the source device 120, or the destination device 130 as shown in FIG. 1. Accordingly, the device 1100 can be implemented at or as at least a part of the network device 110, the source device 120, or the destination device 130.

As shown, the device 1100 includes a processor 1110, a memory 1120 coupled to the processor 1110, a suitable transmitter (TX) and receiver (RX) 1140 coupled to the processor 1110, and a communication interface coupled to the TX/RX 1140. The memory 1110 stores at least a part of a program 1130. The TX/RX 1140 is for bidirectional communications. The TX/RX 1140 has at least one antenna to facilitate communication, though in practice an Access Node mentioned in this application may have several ones. The communication interface may represent any interface that is necessary for communication with other network elements, such as X2 interface for bidirectional communications between eNBs, SI interface for communication between a Mobility Management Entity (MME)/Serving Gateway (S-GW) and the eNB, Un interface for communication between the eNB and a relay node (RN), or Uu interface for communication between the eNB and a terminal device.

The program 1130 is assumed to include program instructions that, when executed by the associated processor 1110, enable the device 1100 to operate in accordance with the embodiments of the present disclosure, as discussed herein with reference to FIGS. 2A to 10. The embodiments herein may be implemented by computer software executable by the processor 1110 of the device 1100, or by hardware, or by a combination of software and hardware. The processor 1110 may be configured to implement various embodiments of the present disclosure. Furthermore, a combination of the processor 1110 and memory 1110 may form processing means 1150 adapted to implement various embodiments of the present disclosure.

The memory 1110 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 1110 is shown in the device 1100, there may be several physically distinct memory modules in the device 1100. The processor 1110 may be of any type suitable to the local technical network, and may include one or more of general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIG. 2 or 11 Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a source device, the method comprising:
    transmitting data to a plurality of destination devices in a groupcast communication;
    transmitting sidelink control information (SCI) to the plurality of destination devices,
    wherein, whether a first resource allocated to a first destination device among the plurality of destination devices for a Hybrid Automatic Repeat Request (HARQ) feedback associated with the data is a device-specific resource or is a common resource among a set of the plurality of destination devices depends on the SCI; and
    receiving the HARQ feedback from the first destination device in the first resource,
    wherein the device-specific resource and the common resource are non-overlapped with each other in a frequency domain or in a domain associated with cyclic shift.

2. The method of claim 1, wherein:
    when the first resource is the device-specific resource, the HARQ feedback includes either ACK or NACK, and
    when the first resource is the common resource, the HARQ feedback includes only NACK.

3. The method of claim 1, wherein the HARQ feedback is enabled based a number of the plurality of destination devices being below a threshold.

4. The method of claim 1, wherein the plurality of destination devices comprises a first set of destination devices and a second set of destination devices, the method further comprising:
   allocating a first set of resources specific to the first set of destination devices for the HARQ feedback and a second set of resources common among the second set of destination devices for the HARQ feedback.

5. A method performed by a network node, the method comprising:
   allocating resources for Hybrid Automatic Repeat Request (HARQ) feedbacks associated with data,
   wherein, whether a resource from the resources is a device-specific resource or is a common resource among a plurality of destination devices in a groupcast communication, is determined by each of the plurality of destination devices based on a sidelink control information (SCI) transmitted from a source device to the plurality of destination devices,
   wherein the device-specific resource and the common resource are non-overlapped with each other in a frequency domain or in a domain associated with cyclic shift.

6. A method performed by a destination device, the method comprising:
   receiving data from a source device;
   receiving, from the source device, sidelink control information (SCI);
   receiving, from a network device, information allocating resources for Hybrid Automatic Repeat Request (HARQ) feedbacks associated with the data;
   determining, based on the SCI, whether a resource for transmitting a HARQ feedback is a device-specific resource or is a common resource among a plurality of destination devices including the destination device in a groupcast communication; and
   transmitting the HARQ feedback to the source device,
   wherein the device-specific resource and the common resource are non-overlapped with each other in a frequency domain or in a domain associated with cyclic shift.

* * * * *